(12) United States Patent
Tanchette (10) Patent No.: US 12,420,977 B2
(45) Date of Patent: Sep. 23, 2025

(54) THIN WALL CONTAINER MADE WITH A RECYCLED MATERIAL

(71) Applicant: SOCIÉTÉ ANONYME DES EAUX MINÉRALES D'EVIAN ET EN ABRÉGÉ "S.A.E.M.E", Évian-les-Bains (FR)

(72) Inventor: Jean-Baptiste Tanchette, Messery (FR)

(73) Assignee: SOCIÉTÉ ANONYME DES EAUX MINÉRALES D'EVIAN ET EN ABRÉGÉ "S.A.E.M.E", Évian-les-Bains (FR)

( * ) Notice: Subject to any disclaimer, the term of this patent is extended or adjusted under 35 U.S.C. 154(b) by 0 days.

(21) Appl. No.: 17/268,885

(22) PCT Filed: Apr. 10, 2020

(86) PCT No.: PCT/EP2020/060346
§ 371 (c)(1),
(2) Date: Feb. 16, 2021

(87) PCT Pub. No.: WO2020/208243
PCT Pub. Date: Oct. 15, 2020

(65) Prior Publication Data
US 2022/0017254 A1    Jan. 20, 2022

(30) Foreign Application Priority Data

Apr. 12, 2019   (EP) .................................. 19305476

(51) Int. Cl.
*B65D 1/02*   (2006.01)
*B29C 49/06*  (2006.01)
(Continued)

(52) U.S. Cl.
CPC ............ *B65D 1/0207* (2013.01); *B29C 49/06* (2013.01); *B65D 1/0223* (2013.01); *B65D 1/40* (2013.01);
(Continued)

(58) Field of Classification Search
CPC ...... B65D 1/0207; B65D 1/0223; B65D 1/40; B65D 1/26; B29C 2031/7158
(Continued)

(56) References Cited

U.S. PATENT DOCUMENTS 3,733,309 A    5/1973  Wyeth et al.
4,913,945 A *  4/1990  Maruhashi ........... B65D 1/0207
                                              215/370
(Continued)

FOREIGN PATENT DOCUMENTS

DE    102007049750 A1   4/2009
EP        1167214 A2    1/2002
(Continued)

OTHER PUBLICATIONS

Foreign Communication from a Related Counterpart Application, International Search Report and Written Opinion dated Jun. 17, 2020, International Application No. PCT/EP2020/060346 filed on Apr. 10, 2020.
(Continued)

*Primary Examiner* — Michael C Romanowski
(74) *Attorney, Agent, or Firm* — Conley Rose, P.C.

(57) ABSTRACT

A thin wall container for being filled with a liquid reference volume, made with polyethylene terephtalate (PET), comprising a neck and a wall, wherein:
the PET comprises at least 50% by weight of a PET recycled by a mechanical route (rPET), and,
the container presents at least the following feature:
Feature a) the wall has a thin portion having an average thickness of from 50 μm to 150 μm.

2 Claims, 4 Drawing Sheets

(51) Int. Cl.
  *B29K 67/00* (2006.01)
  *B29L 31/00* (2006.01)
  *B65D 1/40* (2006.01)
(52) U.S. Cl.
  CPC . *B29K 2067/003* (2013.01); *B29L 2031/7158* (2013.01)
(58) Field of Classification Search
  USPC .............................. 215/379; 428/34.1–36.92
  See application file for complete search history.

(56) References Cited

U.S. PATENT DOCUMENTS

| | | | |
|---|---|---|---|
| 5,628,957 A | 5/1997 | Collette et al. | |
| 5,829,614 A * | 11/1998 | Collette | B65D 1/0207 220/609 |
| 5,921,416 A * | 7/1999 | Uehara | B65D 1/0215 264/516 |
| 6,168,041 B1 * | 1/2001 | Berger | B65D 35/08 220/666 |
| 6,355,319 B1 | 3/2002 | Nakamachi et al. | |
| 7,226,648 B2 * | 6/2007 | Al Ghatta | B65D 77/06 428/34.2 |
| 9,828,166 B2 * | 11/2017 | Bouffand | B65D 1/40 |
| 10,150,241 B2 | 12/2018 | Knight et al. | |
| 2001/0009951 A1 * | 7/2001 | Schmidt | C08L 67/02 528/308.1 |
| 2002/0061371 A1 * | 5/2002 | Schmidt | B65D 1/0284 428/35.7 |
| 2005/0158495 A1 | 7/2005 | Nahill | |
| 2006/0127615 A1 * | 6/2006 | Kikuchi | B29B 11/12 428/35.7 |
| 2007/0108156 A1 * | 5/2007 | Durand | B65D 1/023 215/375 |
| 2008/0050546 A1 * | 2/2008 | Kitano | B29C 43/203 428/35.7 |
| 2010/0000962 A1 * | 1/2010 | Lepoitevin | B65D 1/42 215/381 |
| 2010/0298852 A1 | 11/2010 | Slater | |
| 2011/0031243 A1 | 2/2011 | Lester | |
| 2011/0256331 A1 | 10/2011 | Codd et al. | |
| 2012/0132607 A1 * | 5/2012 | Landman | B29B 11/08 264/537 |
| 2013/0213922 A1 * | 8/2013 | Denis | B65D 23/102 426/106 |
| 2014/0033654 A1 | 2/2014 | Stanley et al. | |
| 2015/0298852 A1 * | 10/2015 | Higareda | B29C 49/08 206/524.6 |
| 2015/0321826 A1 * | 11/2015 | Bouffand | B65D 1/023 425/522 |
| 2016/0101888 A1 * | 4/2016 | Want | B29C 48/40 264/540 |
| 2016/0236820 A1 * | 8/2016 | Paauwe | B29C 49/08 |
| 2017/0233161 A1 | 8/2017 | Siegl | |
| 2020/0079900 A1 * | 3/2020 | Salazar Hernandez | B65D 1/0246 |
| 2024/0100742 A1 * | 3/2024 | Siegl | B29C 48/022 |

FOREIGN PATENT DOCUMENTS

| | | | | |
|---|---|---|---|---|
| EP | 1436203 | * | 7/2004 | ............... B65D 1/02 |
| EP | 1436203 B1 | | 7/2004 | |
| EP | 1468930 A1 | | 10/2004 | |
| EP | 1527999 A1 | | 5/2005 | |
| EP | 1543939 A2 | | 6/2005 | |
| EP | 1815960 A1 | | 8/2007 | |
| EP | 2423120 A2 | | 2/2012 | |
| EP | 2544874 A1 | | 1/2013 | |
| EP | 2660165 A1 | | 11/2013 | |
| EP | 2933201 A1 | | 10/2015 | |
| EP | 3131822 B1 | | 2/2020 | |
| EP | 3722219 A1 | | 10/2020 | |
| EP | 3953262 A1 | | 2/2022 | |
| JP | H1095903 A | * | 4/1998 | ............... B65D 1/09 |
| JP | 2001122237 A | | 5/2001 | |
| JP | 2002011719 A | | 1/2002 | |
| JP | 200280021 A | | 3/2002 | |
| JP | 2002103429 A | | 4/2002 | |
| JP | 2002104362 A | | 4/2002 | |
| JP | 2003191319 A | | 7/2003 | |
| JP | 2004148616 A | | 5/2004 | |
| JP | 2004160669 A | | 6/2004 | |
| JP | 2004160670 A | | 6/2004 | |
| JP | 2005505477 A | | 2/2005 | |
| JP | 2006232317 A | | 9/2006 | |
| JP | 2006321908 A | | 11/2006 | |
| JP | 4290823 B2 | | 7/2009 | |
| JP | 2014080594 A | | 5/2014 | |
| JP | 2014198422 A | | 10/2014 | |
| JP | 2016504245 A | | 2/2016 | |
| JP | 2017203116 A | | 11/2017 | |
| JP | 2018154355 A | | 10/2018 | |
| MX | 2006004623 A | | 4/2006 | |
| WO | 9848994 A1 | | 11/1998 | |
| WO | 0183193 A1 | | 11/2001 | |
| WO | 03033361 A2 | | 4/2003 | |
| WO | 03047841 A1 | | 6/2003 | |
| WO | 2005066027 A1 | | 7/2005 | |
| WO | 2005102667 A2 | | 11/2005 | |
| WO | 2011110660 A1 | | 9/2011 | |
| WO | 2012065162 A1 | | 5/2012 | |
| WO | 2013080926 A1 | | 6/2013 | |
| WO | 2014101956 A1 | | 7/2014 | |
| WO | 2015160902 A1 | | 10/2015 | |
| WO | 2015180094 A1 | | 12/2015 | |
| WO | 2016005493 A1 | | 1/2016 | |
| WO | 2016200653 A1 | | 12/2016 | |
| WO | 2017136584 A1 | | 8/2017 | |
| WO | 2017183048 A1 | | 10/2017 | |
| WO | 2017199146 A2 | | 11/2017 | |
| WO | 2018224652 A1 | | 12/2018 | |
| WO | 2019041205 A1 | | 3/2019 | |
| WO | 2020208243 A1 | | 10/2020 | |
| WO | 20200208243 A1 | | 10/2020 | |

OTHER PUBLICATIONS

Foreign Communication from a Related Counterpart Application, Extended European Search Report dated Nov. 4, 2019, European Application No. 19305476.4 filed on Apr. 12, 2019.
"Vöslauer mineral water is PET Recycling Champion. PET bottles consist of 70% recycled bottles.", Press Release, Voslauer, 2 pages.
Amazonas, et al., "Research Shows Which PTE Water Bottle Design Attributes Impact Recycling", PTI Report, 7 pages.
PET Planet Insider, Magazine for Bottlers and Bottle Makers, vol. 11, No. 05/10, May 17, 2010, 52 pages.
PET Planet Insider, Magazine for Bottlers and Bottle Makers, vol. 12, No. 05/11, May 23, 2011, 48 pages.
Coca-Cola FEMSA Integrated Report 2017, Integrated Transformation, 76 pages.
Screenshot from the Coca-Cola FEMSA website, 1 page.
"Ciel presents a bottle made 100% from other bottles", Mexican Leaders.com, hllps://lideresmexicanos.com/innovacion/ciel-presenta-botella-hecha-100-de-otras-botellas/1.
"Final Report—Minimum thickness of plastic bottles to be recycled-research findings", WRAP, Oct. 2018, 36 pages.
"Study Confirms the Excellent Carbon Footprint of Recycled PET ", Press Release, Hard/Wollersdorf, Aug. 9, 2017, 5 pages, hllps://www. al pla .com/e n/pressre lease/2017/OS/study-confirms-excellent-carbon-footprint-recycled-pet.
"Transparency Physics", Wikipedia, 10 pages.
"Transmission Physics", Wikipedia, 10 pages.
Venkatachalam, et al., "Degradation and Recyclability of Poly (Ethylene Terephthalate)", Intech—Polyester, Chapter 4, 24 pages, http://dx.doi org/10.5772/48612.
Chanda, et al., "Plastics Technology Handbook", Fourth Edition, Plastics Engineering, 25 pages.
Momany, T., "The Impact of Recycled PET Content on PET Hot-Fill Containers", White Paper, 2018, 5 pages.

(56) References Cited

OTHER PUBLICATIONS

"Plastic bottles: Turning Back the Plastic Tide", House of Commons Environmental Audit Committee, First Report of Session 2017, 42 pages.
"Minimum thickness of plastic bottles to be recycled—Research Summary", WRAP Summary Report, 4 pages.
Awaja, et al., "Recycling of PET", European Polymer Journal 41, 2005, pp. 1453-1477.
Scaccabarozzi, et al., "Contactless measurement of PET bottles' thickness", 14th Imeko Tcio Workshop Technical Diagnostics New Perspectives in Measurements, Tools and Techniques for system's reliability, maintainability and safety Milan, Italy, Jun. 27-28, 5 pages, 2016.
Clark, D., "Processing PCR: How It's Done at a Leading PET Bottle Maker", Plastics Technology, Feb. 2010, 6 pages, https://web.archive.org/web/20110704194854/hllps:/www.ptonline.com/articles/processing-pcr-how-its-done-at-a-lead ing-pet-bollle-maker.
Amazonas, et al., "Research Shows Which PET Water Bottle Design Attributes Impact Recycling", PIT, White Paper, 7 pages.
Recycling Technology Worldwide, Edition 5, 2015, 76 pages.
Specification of a PET water bottle from Alpla-Werke, 2 pages.
EuCertPlast certificate for PET to PET recycling, Summary Sheet, Certificate No. 0031-04-20-CYC-SB, 1 page.
Specification of a PET water bottle from Alpla-Werke, 1 page.
"Nestle Pure Life launches bottle made from 100% rPET", Beverage Industry, Feb. 2018, 2 pags.
Montcalm press release Oct. 2010, 10 pages.
Montcalm advertisement Oct. 2010, 2 pages.
Hors série LSA Mar. 2011—Montcalm, 6 pages.
Usine Nouvelle, Montcalm all in RPET, Pyrenean mineral water brand is to be offered in a bottle made from 100% material recycled, Nov. 2010, 4 pages.
Preforms data sheet—15005097-103606, 2 pages.
Preform Drawing—15005097 from Plastipak PPU, 1 page.
Plastipak LuxPET Invoice 2013, 2 pages.
Plastipak LuxPET Invoice 2014, 2 pages.
Plastipak LuxPET Invoice 2015, 2 pages.
Plastipak Preform Food Compliance Certificate 2015, 4 pages.
Montcalm 100% rPET Bottle Food Compliance Certificate 2015, 4 pages.
Sidel Drawing 11065353, 1 page.
Montcalm bottle photo, 1 page.
Montcalm Analysis Report and bottle measurements, 4 pages.
Montcalm Bottle stretch-ratio document, 1 page.
Witness Statement of Christophe Williame, 10 pages.
Usine Nouvell, "Ten years of rPET at Roxpet", 2019, 6 pages.
Usine Nouvell, "Twice as much rPET for Roxane", 2012, 6 pages.
Usine Nouvell, "A hydration bubble for the house", 2019, 8 pages.
Usine Nouvell, "Twelve brands commit to rPET", 2018, 10 pages.
"Scientific Opinion on the safety assessment of the process FPR based on Starlinger Recostar PET technology used to recycle post-consumer PET into food contact materials", EFSA Journal, 2014; 12(2):3572, 15 pages, doi: 10.2903/j.efsa.2014.3572.
"Recycling of Plastics", The Scientific Notes of the Office, Jun. 2023, 42 pages.
"Mechanical vs Chemical Recycling", Bioplastics News, 2020, 5 pages, https://bioplasticsnews.com/2020/11/20/differeneemechanical.
"Plastics—Guidelines for the recovery and recycling of plastics waste", International Standard, ISO 15270:2008(E), Second edition, 2008, 24 pages.
Hopewell, et al., "Plastics recycling: challenges and opportunities", Philosophical Transactions of the Royal Society B, 2009, 364, 2115-2126, doi: 10.1098/rstb.2008.0311.
Datenblatt EcoPet, Ever Loop, 4 pages.
"First PET bottle made from 100 percent PET recyclate", Recycling Magazine, Dec. 2018, 24 pages.
"Plastic Waste: a European strategy to protect the planet, defend our citizens and empower our industries", European Commission—Press release, Strasbourg, Jan. 16, 2018, 3 pages.
"Directive (EU) 2018/852 of the European Parliament and of the Council", Official Journal of the European Union, May 30, 2018, 14 pages.
"How is a PET bottle?", The Wayback Machine, 16 pages, Nov. 20, 2014, https://web.archive.org/web/20160524095822/http://befootec.de/wie-entsteht-eine-pet-flasche/.
Al-Salem, et al., "Recycling and recovery routes of plastic solid waste (PSW): A review", Waste Management 29, 2009, 2625-2643, doi:10.1016/j.wasman.2009.06.004.
"Recycling of plastic packaging—PET beverage bottles and other applications", Institute for Process Engineering and Packaging, 9th BfR Consumer Protection Forum, Oct. 28, 2010, Berlin, 51 pages.
KHS Competence Magazine, Aug. 1, 2019, Issue D31, 72 pages.
Braundau, "Stretch Blow Molding: Third Edition", Plastics Design Library, 2017, 83 pages.
"PET Bottle Recycling, Wikipedia, Retrieved from Internet Nov. 20, 2024, 5 pages, https://en.wikipediaorg/w/index.php?title=PETbottle=recycling&oldid=891225689".
PET Planet Insider, Magazine for Bottlers and Bottle Makers, vol. 19, Apr. 2018, 88 pages.
PET Planet Insider, Magazine for Bottlers and Bottle Makers, vol. 19, Dec. 2018, 56 pages.
"Five grams for 500 millilitres: KHS & Husky collaborate for super-light PET bottle", 3 pages, Sep. 2, 2017, hllps://packagingeurope.com/five-grams-for-500-millilitres-khs-and-husky-collaborate-for-super-light-pet-bollle/3335.article.
"Vital, top-quality water supply", KHS Filling and Packaging—Worldwide, 5g Bottle Internet Archive Evidence, Jul. 11, 2018, 6 pages, retrieved Nov. 22, 2024, https://web.archive.org/web/20181107020416/hllps://www.khs.com/en/water/.
"PET Collection and Recycling Rates in Europe Significantly Increased in 2016 (/ News-Events/110-PET-Collection-Recycli ng•Rates-Eu rope-Sign i ficantly-2016. html)", Petcore Europe, Dec. 2017, 4 pages.
Hestin, et al., "Deloitte Sustainability—Blueprint for plastics packaging waste: Quality Sorting & Recycling—Final Report", 2017, 41 pages.
Mudgal, et al., "Study on an increased mechanical recycling target for plastics", Plastics Recyclers Europe, Aug. 2013, 42 pages.
PET Planet Insider, Magazine for Bottlers and Bottle Makers, vol. 1, No. 11/10, Nov. 1, 2010, 52 pages.
PET Planet Insider, Magazine for Bottlers and Bottle Makers, vol. 16, No. 06/15, Jun. 8, 2015, 52 pages.
Ice River Springs, Web Archive, 2016, retrieved from the Internet Dec. 2, 2024, https://web.archive.org/web/20160316195058/http://iceriversprings.com/ice-river-green/.
Ice River Springs, Web Archive, 2019, retrieved from the Internet Dec. 2, 2024, https://web.archive.org/web/20160320020147/http://iceriversprings.com/private-label-bottling/.
PET Planet Insider, Magazine for Bottlers and Bottle Makers, vol. 20, No. 03/19, Mar. 4, 2019, 56 pages.
Package Vending Specifications Document—Royal Vendors, Inc., Web Archive, 2018, retrieved from Internet Nov. 26, 2024, hllps://web.archive.org/web/20181213022305/hllps://www.royalvendors.com/customer-service/technical-info/package-vending-specs/.
Allahkarami, et al., "Thickness Measuring Methods Aiding Lightweighting of PET Bottles", Research Gate, Conference Paper Apr. 2014, 6 pages.
Caballero, Martin, "Study Finds Recyclability Issues in Weight, Labels for PET Bottles", ENSO Plastics Blog, 2018, retrieved from Internet Dec. 3, 2024, 4 pages, https://web.archive.org/web/20180709000306/http://ensoplastics.com:80/theblog/?p=2914.
Foreign Communication from a Related Counterpart Application, Japanese Notice of Reasons for Revocation dated May 30, 2025, Japanese Application No. 2021-505804.
BePETTM Process https://web.archive.org/web/20120327153412/http://www.bepet.com/recycling-of-plastics-bepet.htm.

* cited by examiner

THIN WALL CONTAINER MADE WITH A RECYCLED MATERIAL

The invention concerns thin wall containers made with recycled PET. The containers present a low coloration.

Polyethylene terephtalate (PET) is widely used for packaging beverages. "Crystal" grades of PET, free of coloring agents, present a high transparency, and containers made therewith also present a high transparency. Transparent containers, such as bottles, are especially appreciated for packaging transparent liquids such as waters.

PET recycled by mechanical routes (rPET) is known. This material has been used in bottles usually mixed with virgin PET. Some bottles made with 100% of rPET have also been commercialized. Using recycled PET allows a preservation of the environment. However, rPET and containers made therewith are not as transparent as virgin PET and present a somewhat grey un-wanted or un-appreciated coloration. For this reason, bottles made of 100% rPET have been used so far for containing non-transparent liquids, such as non-transparent beverages. Such beverages thus mask the container coloration that is un-appreciated by some consumers. There is a need for containers comprising rPET adapted to package transparent liquids such as waters.

The invention addresses at least one of the problems or needs mentioned above, with a thin wall container for being filled with a liquid reference volume, made with polyethylene terephtalate (PET), comprising a neck and a wall, wherein:
 the PET comprises at least 50% by weight of a PET recycled by a mechanical route (rPET), and,
 the container presents at least the following feature:
  Feature a) the wall has a thin portion having an average thickness of from 50 μm to 150 μm.

In one embodiment, the container further presents the following feature:
 Feature b) the container is a blow molded container, and has a planar stretch ratio of from 12.0 to 27.0.

In one embodiment, the container further presents the following feature:
 Feature c) the container has a ratio between the container weight and the liquid reference volume of
  from 5.27 g/L to 9.33 g/L, or
  from 4.0 g/L to less than 5.27 g/L with the proviso that the liquid reference volume is of at least 10.0 L, or
  from more than 9.33 g/L to 20.0 g/L, with the proviso that the liquid reference volume is of at most 2.0 L.

The invention also concerns a process of making the container. The invention also concerns the use of PET recycled by a mechanical route (rPET) in the containers. The invention also concerns the use of PET recycled by a mechanical route (rPET) in the containers filled with transparent liquids such as water.

In the containers presenting at least one of features a) to c), the coloration due the rPET is found to be surprisingly low and adapted for transparent liquids such as water.

DETAILED DESCRIPTION OF THE INVENTION

The container is a thin wall container made with polyethylene terephtalate (PET), comprising a neck and a wall. It can be filled with a liquid. In other words, the container can comprise a liquid. Examples of containers include bottles having a neck, a sidewall and a bottom. Other shapes or forms of containers are also encompassed.

The liquid is typically present in a reference volume, filling all the container, with the exception of an optional head space. The container filled with the liquid is typically sealed, typically with a closure. The closure can be any type of closure, for example a cap or a flexible lid. The closure can be for example a threaded cap or a snap cap. The container can be opened by removing the closure or by at least partially piercing the closure.

Containers presenting a neck and a wall are known. The container is a thin wall container, having a body and a neck including an opening. The body is comprised of the wall. The wall typically comprises a bottom portion, a side portion, and a shoulder portion. The opening can be a neck provided on the shoulder portion opposite to the bottom portion. To allow a deformation, and to allow plastic saving, the body, or wall, or parts thereof has a low average thickness on at least a portion, preferably at least a portion representing at least 50% as length or surface of the body, preferably at least 80%, preferably all the body. The bottom and/or the shoulder can present higher average thicknesses, up to 100% more than the average thickness of the rest of the body. In one embodiment the wall comprises a bottom portion, a side portion, and a shoulder portion, wherein the thin portion is at least the side portion.

The container presents at least feature a). In one embodiment the container presents features a) and b). In one embodiment the container presents features a) and c). In one embodiment the container presents features a) and b) and c).

According to feature a) The average thickness of the wall is of from 50 μm to 150 μm, for example from 50 μm to 75 μm or from 75 μm to 100 μm or from 100 μm to 125 μm or from 125 μm to 150 μm.

The average thickness of the body can be for example of from 50 μm to 150 μm, for example from 50 μm to 75 μm or from 75 μm to 100 μm or from 100 μm to 125 μm or from 125 μm to 150 μm.

The side portion can comprise a straight portion, that is to say that the side portion presents a cylindrical shape, and preferably a circular cylindrical shape. In an embodiment the side portion can be slightly convex. In an embodiment the side portion presents a griping portion, as a recess, having concave parts. The thickness of the side portion is low and allows a deformation. For example, the thickness of the side portion can be of from 50 μm to 150 μm, for example from 50 μm to 75 μm or from 75 μm to 100 μm or from 100 μm to 125 μm or from 125 μm to 150 μm. In one embodiment the side portion is free of ridge, edge, groove, or rib. In one embodiment the side portion comprises at least one ridge, edge, groove and/or rib.

The bottom portion can present a shape allowing the container to stand, for example a substantially flat, optionally ribbed shape, or a petaloid shape. Such shapes are known for bottles. In one embodiment the bottom portion presents a hemispheric shape. The thickness of the bottom portion can be for example of from 105 μm to 275 μm, preferably from 125 μm to 225 μm, for example for example from 125 μm to 150 μm or from 150 μm to 175 μm or from 175 μm to 200 μm or from 200 μm to 225 μm. In one embodiment the bottom portion is free of ridge, edge, groove, or rib. In one embodiment the bottom portion comprises at least one ridge, edge, groove and/or rib.

The shoulder portion is typically an intermediate portion between the neck and a side portion. In one embodiment the shoulder portion presents a hemispheric shape. The thickness of the shoulder portion can be for example of from 105 μm to 275 μm, preferably from 125 μm to 225 μm, for example for example from 125 μm to 150 μm or from 150 μm to 175 μm or from 175 μm to 200 μm or from 200 μm to 225 μm. In one embodiment the shoulder portion is free of ridge, edge, groove, or rib. In one embodiment the shoulder portion comprises at least one ridge, edge, groove and/or rib.

Features such as ridges, edges, grooves and/or ribs that might be present on the sidewall, bottom and/or shoulder of the container modify the visual impression provided by the container, for example by generating some reflections that can modify the impression of transparency. The unwanted coloration can be perceived to a higher extend in portions that are free of such features. Thus lowering the unwanted coloration is more useful in portions that are free of ridges, edges, grooves and/or ribs, and is more of a challenge.

In one embodiment the bottom portion and shoulder portion present a similar shape, and preferably, the bottom portion and shoulder portion present the same hemispheric shape. Consequently, when considering that the side portion is a circular cylinder, the container is symmetrical (except for the neck portion) and can be handled similarly in an upright or upside-down position. Containers with such hemispherical shapes and straight or slightly convex side portions are particularly visually attractive and/or otherwise visually differentiating for consumers. These features have been found to allow some manufacturing and/or usage advantages such as an easier process of manufacturing, as being close to the natural shape upon blowing before, with low constraints upon conforming with the mold, during a blow molding process.

It is mentioned that the container can be free of any label, such as a banderole or laminate adhered to the sidewall. These can cover at least partially the unwanted coloration, but constitute more packaging elements, which is expensive and/or contribute to complexify recycling and/or to lower the purity of recycled streams.

Liquid

The liquid is typically comprised or filled in the container. It is typically to be released out of the container, via the neck. It is preferably a drinkable, potable, liquid. Examples of such liquids include waters and beverages.

Examples of waters include tap water, purified and/or sterilized waters, such as distilled waters, well waters, spring waters, and mineral waters. The waters can be supplemented with some additives such as salts, minerals, electrolytes. The waters can be supplemented with some functional additives such as vitamins. The waters can be acidic, neutral or alkaline waters. The waters can be still waters or sparkling waters, for example carbonated, for example naturally carbonated, artificially carbonated or partially naturally carbonated.

Examples of beverages include alcoholic or non-alcoholic beverages, flavored waters, aquadrinks, optionally flavored milks, for example milks form animal origin such as cow milk or vegetal substitutes such as soy milk, almond milk, cashew milk, oat milk, rice milk, coconut milk, fermented beverages such as drinking yogurts or vegetal substitutes, kefirs, kombuchas, infused beverages, ready to use coffees, ready to use teas, ready to use creamers, fruit juices or nectars, carbonated soft drinks such as colas or sodas. The non-alcoholic beverages can for example comprise sugar, sweeteners and/or fruit or vegetable or their extracts.

In a preferred embodiment the liquid is a transparent liquid. Examples of transparent liquids include waters, as described above.

Material

The container is made with a PET plastic material. The material and the container structural features, such as the thickness and the shape, can be such that the container has at least a deformable, flexible, part when it is empty. Feature a), b), c) provide such deformable, flexible parts.

PET and rPET are for example available in various grades or compositions, for example packaging grades or compositions, for example bottles grades or compositions. PET is especially appropriate for waters. Waters are very sensitive to taste modification, and PET has been found not to alter the waters' taste over storage periods of at least 3 months, preferably at least 6 months, preferably at least 12 months, preferably at least 24 months.

rPET is known and commercially available. In an embodiment it has been recycled by post-consumer (PC) recycling, where the container is recycled from waste streams after use by a consumer and disposal by a user or consumer. The recycling typically involves sorting waste streams, to recover a stream of the selected material, and processing the stream with steps such as refining, washing and/or grinding. For example, PET can be sorted from waste streams, and then processed according to various routes. The mechanical route involves refining, washing and/or grinding to recover a rPET polymer. The recovered rPET polymer can be subjected to a solid-state polymerization to re-increase its molecular weight, for example to re-increase its Intrinsic Viscosity (IV). The unwanted coloration of post-consumer rPET is significantly much higher than rPET obtained by post-industrial recycling where clean articles or parts of articles are recycled from production sites. The latter are high purity streams, with lower amounts of impurities coming from other materials and generating some coloration. Thus lowering the unwanted coloration is more useful for post-consumer rPET and is more of a challenge.

The PET can for example be a 100% recycled PET (rPET), or comprise an amount of R % by weight of rPET and an amount of 100-R % of a virgin PET, wherein R is of at least 50% or at least 60% or at least 70%, or at least 80%, or at least 90%.

The PET material of the container comprises at least 50% by weight of a PET recycled by a mechanical route (rPET). The rest of the PET can be virgin PET, prepared for from monomers, and or PET recycled by chemical or microbiological routes. For example, the PET material comprises at least 50%, preferably at least 80%; by weight of rPET and at most 50%, preferably at most 20%, by weight of virgin PET and/or PET recycled by chemical or microbiological routes.

In one embodiment the PET is a mixture of rPET and virgin PET. The mixture can be implemented as several layers, or by mixing pellets of rPET and virgin PET, before or upon melting for forming the container or a preform, or by mixing and melting rPET and virgin PET for forming pellets. Such mixtures or mixing procedures are known by the one skilled in the art.

In one embodiment the PET essentially consists of the recycled PET. In other words, the container is a 100% by weight rPET.

It is mentioned that PET (either virgin PET or rPET) is recyclable, for example by the mechanical route, a chemical route and/or a microbiological route. The chemical route involves depolymerizing to recover monomers. The monomers can be re-polymerized to obtain a recycled fresh polymer. For example, PET or rPET can be depolymerized by hydrolysis, methanolysis, glycloysis, ammonolysis or aminolysis to obtain recycled terephthalic acid or a diester thereof and recycled monoethylene glycol. The recycled terephthalic acid or diester and/or the recycled monoethylene glycol can be repolymerized, optionally with adding some virgin terephthalic acid or diester and/or the monoethylene glycol. Similarly, the microbiological route involves treating the stream of material by micro-organisms to obtain de-polymerized oligomers or monomers, and then repolymerizing said monomers or oligomers, optionally with adding some virgin monomers or oligomers.

The PET can comprise some additives, known by the one skilled in the art, such as stabilizers, lubricants etc . . . . In one embodiment the PET comprises coloring agents such as pigments or optical modifiers. In one embodiment the PET is substantially free of coloring agents.

The container can be formed from the PET by a molding process, such as a blow molding process, for example an Extrusion Blow Molding process or an Injection Blow Molding process, for example an Injection Stretch Blow Molding process. Injection (Stretch) Blow Molding processes are especially suitable for the PET. They involve forming a PET preform by injection, heating the preform, placing the preform in a mold, and blowing a gas, usually air, in the heated preform to blow the material in the mold and conform the material with the mold. Upon blowing the PET stretches, becomes thinner, and gets resistance by strain hardening and/or strain induced crystallization phenomenon(s). Such processes are well known. Equipments and materials, virgin or recycled, are commercially available.

The preform can be a monolayer preform, to obtain a monolayer container. For example, the preform is a monolayer PET. For example, the container can be a monolayer PET container. The preform can be multilayer preform, to obtain multilayer container. For example, the preform can have a layer of virgin PET and a layer of rPET, preferably as an external at least partial layer. For example, the container can have a layer of virgin PET and a layer of rPET, preferably as an external at least partial layer.

The container has typically a reference volume, defined as the maximum volume when the container is not deformed.

The container reference volume can be of at least 0.1 L, for example at least 0.5 L, for example at least 1.0 L, for example at least 3.0 L for example at least 4.0 L, for example at least 5.0 L. The container can have a reference volume of at most 22.0 L, for example at most 16.0 L, for example at most 11.0 L, for example at most 5.5 L, for example at most 3.3 L, for example at most 1.1 L. The container can have a reference volume of from 0.1 to 0.55 L or from 0.5 L to 1.1 L or from 1.0 L to 3.3 L or from 3.0 L to 4.4 L or from 4.0 L to 5.5 L, or from 5.0 L to 6.6 L, or from 6.0 L to 7.7 L, or from 7.0 L to 8.8 L, or from 8.0 L to 9.9 L, or from 9.0 L to 11.0 L; or from 10.0 L to 16.0 L or from 16.0 L to 22.0 L.

The container is typically filled with a reference volume of the liquid and sealed. The liquid reference volume is the maximum amount of liquid comprised in the container, before release. The liquid reference volume is typically slightly lower than the container reference volume, as the filled and closed container typically presents a head space (part or the container that is not filled). The head space is preferably of from 0% to 10% of the liquid reference volume, for example from 1% to 10% or from 1% to 5%. The liquid reference volume can be of from of at least 0.1 L, for example at least 0.5 L, for example at least 1.0 L, for example at least 3.0 L for example at least 4.0 L, for example at least 5.0 L. The liquid reference volume can be of at most 20.0 L, for example at most 15.0 L, for example at most 10.0 L for example at most 5.0 L, for example at most 3.0 L, for example at most 1.0 L. The liquid reference volume can be of from 0.1 L to 0.5 L or from 0.5 L to 1.0 L or from 1.0 L to 3.0 L or from 3.0 L to 4.0 L or from 4.0 L to 5.0 L, or from 5.0 L to 6.0 L, or from 6.0 L to 7.0 L, or from 7.0 L to 8.0 L, or from 8.0 L to 9.0 L, or from 9.0 L to 10.0 L, or from 10.0 L to 15.0 L, or from 15.0 L to 20.0 L. For example, the liquid reference volume can be of from 4.9 L to 5.1 L.

The thickness of the blown container can be managed by adapting, for a given container reference volume, the preform, in particular its shape and wall thickness, and by adapting the stretching parameters. It is mentioned that the geometry of the preform, such as its length, its diameter, and its bottom shape, determine, together with the neck, the weight of the preform and thus the weight of the container. The stretching can be described by the following parameters:

Axial Stretch ratio (ratio between length of container under neck and the length of the preform under neck);
Hoop Stretch ratio (ratio between the diameter of container and the diameter of the preform, at half length);
Planar Stretch ratio: Axial Stretch Ratio X Hoop Stretch Ratio.

According to feature b) the planar stretch ratio is of from 12.0 to 27.0, preferably from 15.0 to 20.0. The axial stretch ratio can be for example of from 3.0 to 4.5, preferably from 3.3 to 4.0. The hoop stretch ratio can be for example of from 4.0 to 6.0, preferably from 4.5 to 5.5.

In one embodiment, according to feature c), the container presents a packaging efficacy, determined as ratio between the container weight and the liquid reference volume, of from 5.27 g/L to 9.33 g/L, preferably of from 5.27 g/L to 7.33 g/L, preferably form 5.80 g/L to 7.00 g/L. In this embodiment the liquid reference volume can be preferably of from 2.0 L to 10.0 L.

In one embodiment, according to feature c), the container presents a packaging efficacy, determined as ratio between the container weight and the liquid reference volume, of from 4.0 g/L to less than 5.27 g/L with the proviso that the liquid reference volume is of at least 10.0 L, for example higher than 10.0 L. The packaging efficacy can be of from 4.0 g/L to less than 5.00 g/L with the proviso that the liquid reference volume is of at least 12.0 L.

In one embodiment, according to feature c), the container presents a packaging efficacy, determined as ratio between the container weight and the liquid reference volume, of from 4 more than 9.33 g/L to 20.0 g/L, with the proviso that the liquid reference volume is of at most 2.0 L, for example lower than 2.0 L. The packaging efficacy can be of from more than 9.33 g/L to 15.0 g/L, with the proviso that the liquid reference volume is of from 0.5 L to 2.0 L. The packaging efficacy can be of from more than 15.0 g/L to 20.0 g/L, with the proviso that the liquid reference volume is of at from 0.1 L to less than 0.5 L.

The container can present a surface density, determined as the ratio between the surface of the body and the container weight, of from 100 to 200 g/m2, for example from 100 to 120 g/m2 or form 120 to 140 g/m2, or form 140 to 160 g/m2, or from 160 to 180 g/m2, or from 180 to 200 g/m2. In one embodiment ratio between the surface of the body and the weight of the body is of from 100 to 200 g/m2, for example from 100 to 120 g/m2 or form 120 to 140 g/m2, or form 140 to 160 g/m2, or from 160 to 180 g/m2, or from 180 to 200 g/m2.

Extra light containers presenting feature a), b), and/or c) require less PET, and thus are especially suitable for economic and/or environmental reasons.

Advantageously, the container when filled with the liquid reference volume and sealed presents a top load resistance of at least 10 daN for at least 5 mm deformation and/or a lateral load resistance of at least 5 daN for at least 2.5 mm deformation.

In one embodiment:
the average thickness is of from 50 μm to 75 μm or from 75 μm to 100 μm or from 100 μm to 125 μm or from 125 μm to 150 μm, and
the PET comprises at least 80% by weight of the recycled PET.

In one embodiment:
the average thickness is of from 50 μm to 75 μm or from 75 μm to 100 μm or from 100 μm to 125 μm or from 125 μm to 150 μm, and
the PET comprises at least 80% by weight of the recycled PET, and
the recycled PET (rPET) has been recycled by mechanical route by post-consumer (PC) recycling.

In one embodiment:
the average thickness is of from 50 μm to 75 μm or from 75 μm to 100 μm or from 100 μm to 125 μm or from 125 μm to 150 μm, and
the PET essentially consists of the recycled PET.

In one embodiment:
the container presents feature a) and the average thickness is of from 50 μm to 75 μm or from 75 μm to 100 μm or from 100 μm to 125 μm or from 125 μm to 150 μm, and
the PET essentially consists of the recycled PET, and
the recycled PET (rPET) has been recycled by mechanical route by post-consumer (PC) recycling.

In one embodiment:
the container presents feature b) and the planar stretch ratio is of from 12.0 to 27.0 or from 15.0 to 20.0, and
the PET comprises at least 80% by weight of the recycled PET.

In one embodiment:
the container presents feature b) and the planar stretch ratio is of from 12.0 to 27.0 or from 15.0 to 20.0, and
the PET comprises at least 80% by weight of the recycled PET, and
the recycled PET (rPET) has been recycled by mechanical route by post-consumer (PC) recycling.

In one embodiment:
the container presents feature b) and the planar stretch ratio is of from 12.0 to 27.0 or from 15.0 to 20.0, and
the PET essentially consists of the recycled PET, and
the recycled PET (rPET) has been recycled by mechanical route by post-consumer (PC) recycling.

In one embodiment:
the container presents feature b) and the container has an axial stretch ratio of from 3.0 to 4.5, preferably from 3.3 to 4.0, and/or the container has a hoop stretch of from 4.0 to 6.0, preferably from 4.5 to 5.5, and
the PET comprises at least 80% by weight of the recycled PET.

In one embodiment:
the container presents feature b) and the container has an axial stretch ratio of from 3.0 to 4.5, preferably from 3.3 to 4.0, and/or the container has a hoop stretch ratio of from 4.0 to 6.0, preferably from 4.5 to 5.5, and
the PET comprises at least 80% by weight of the recycled PET, and
the recycled PET (rPET) has been recycled by mechanical route by post-consumer (PC) recycling.

In one embodiment:
the container presents feature b) and the container has an axial stretch ratio of from 3.0 to 4.5, preferably from 3.3 to 4.0, and/or the container has a hoop stretch ratio of from 4.0 to 6.0, preferably from 4.5 to 5.5, and
the PET essentially consists of the recycled PET.

In one embodiment:
the container presents feature b) and the container has an axial stretch ratio of from 3.0 to 4.5, preferably from 3.3 to 4.0, and/or the container has a hoop stretch ratio of from 4.0 to 6.0, preferably from 4.5 to 5.5, and
the PET essentially consists of the recycled PET, and
the recycled PET (rPET) has been recycled by mechanical route by post-consumer (PC) recycling.

In one embodiment:
the container presents feature c) and has a ratio between the container weight and the liquid reference volume of from 5.27 g/L to 9.33 g/L or from 5.80 g/L to 7.00 g/L, and
the PET comprises at least 80% by weight of the recycled PET.

In one embodiment:
the container presents feature c) and has a ratio between the container weight and the liquid reference volume of from 5.27 g/L to 9.33 g/L or from 5.80 g/L to 7.00 g/L, and
the PET comprises at least 80% by weight of the recycled PET, and
the recycled PET (rPET) has been recycled by mechanical route by post-consumer (PC) recycling.

In one embodiment:
the container presents feature c) and has a ratio between the container weight and the liquid reference volume of from 5.27 g/L to 9.33 g/L or 5.80 g/L to 7.00 g/L, and
the PET essentially consists of the recycled PET.

In one embodiment:
the container presents feature c) and has a ratio between the container weight and the liquid reference volume of from 5.27 g/L to 9.33 g/L or 5.80 g/L to 7.00 g/L, and
the PET essentially consists of the recycled PET, and
the recycled PET (rPET) has been recycled by mechanical route by post-consumer (PC) recycling.

In one embodiment:
the container presents feature c) and has a ratio between the container weight and the liquid reference volume of from 4.0 g/L to less than 5.27 g/L with the proviso that the liquid reference volume is of at least 10.0 L, and
the PET comprises at least 80% by weight of the recycled PET.

In one embodiment:
the container presents feature c) and has a ratio between the container weight and the liquid reference volume of—from 4.0 g/L to less than 5.27 g/L with the proviso that the liquid reference volume is of at least 10.0 L, and
the PET comprises at least 80% by weight of the recycled PET, and the recycled PET (rPET) has been recycled by mechanical route by post-consumer (PC) recycling.

In one embodiment:

the container presents feature c) and has a ratio between the container weight and the liquid reference volume of—from 4.0 g/L to less than 5.27 g/L with the proviso that the liquid reference volume is of at least 10.0 L, and the PET essentially consists of the recycled PET.

In one embodiment:

the container presents feature c) and has a ratio between the container weight and the liquid reference volume of—from 4.0 g/L to less than 5.27 g/L with the proviso that the liquid reference volume is of at least 10.0 L, and the PET essentially consists of the recycled PET, and the recycled PET (rPET) has been recycled by mechanical route by post-consumer (PC) recycling.

In one embodiment:

the container presents feature c) and has a ratio between the container weight and the liquid reference volume of from more than 9.33 g/L to 20.0 g/L, with the proviso that the liquid reference volume is of at most 2.0 L, and the PET comprises at least 80% by weight of the recycled PET.

In one embodiment:

the container presents feature c) and has a ratio between the container weight and the liquid reference volume of from more than 9.33 g/L to 20.0 g/L, with the proviso that the liquid reference volume is of at most 2.0 L, and the PET comprises at least 80% by weight of the recycled PET, and the recycled PET (rPET) has been recycled by mechanical route by post-consumer (PC) recycling.

In one embodiment:

the container presents feature c) and has a ratio between the container weight and the liquid reference volume of from more than 9.33 g/L to 20.0 g/L, with the proviso that the liquid reference volume is of at most 2.0 L, and the PET essentially consists of the recycled PET.

In one embodiment:

the container presents feature c) and has a ratio between the container weight and the liquid reference volume of from more than 9.33 g/L to 20.0 g/L, with the proviso that the liquid reference volume is of at most 2.0 L, and the PET essentially consists of the recycled PET, and the recycled PET (rPET) has been recycled by mechanical route by post-consumer (PC) recycling.

Other details or advantages of the invention will appear in the following non-limiting example(s).

EXAMPLE(S)

Example 1

A 100% rPET container of 5.0 L of water (reference volume) is implemented.

Figure 1:
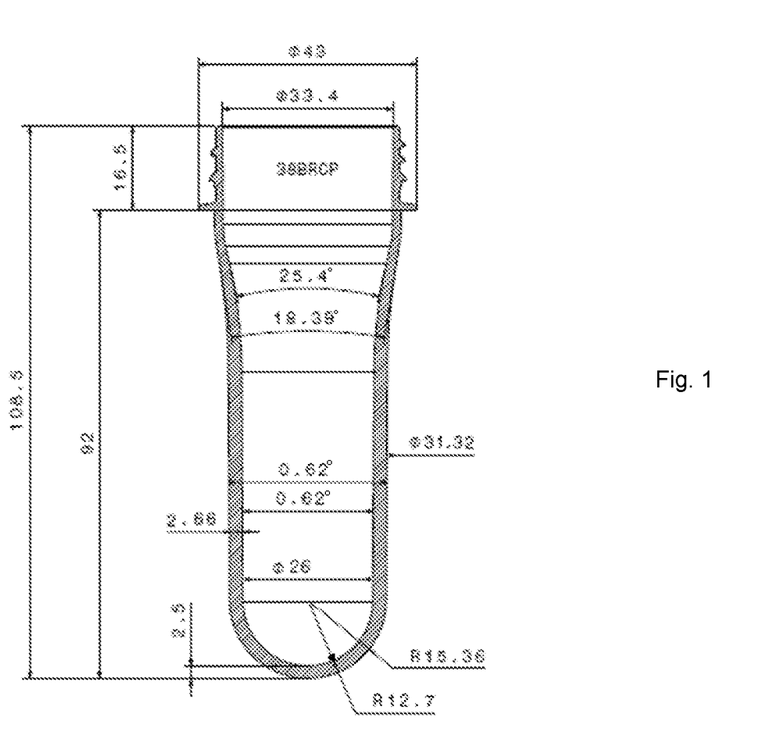
FIG. 1 represents a PET preform of 32 g, for forming a 5 L container. Dimensions are in mm.
Figure 2:
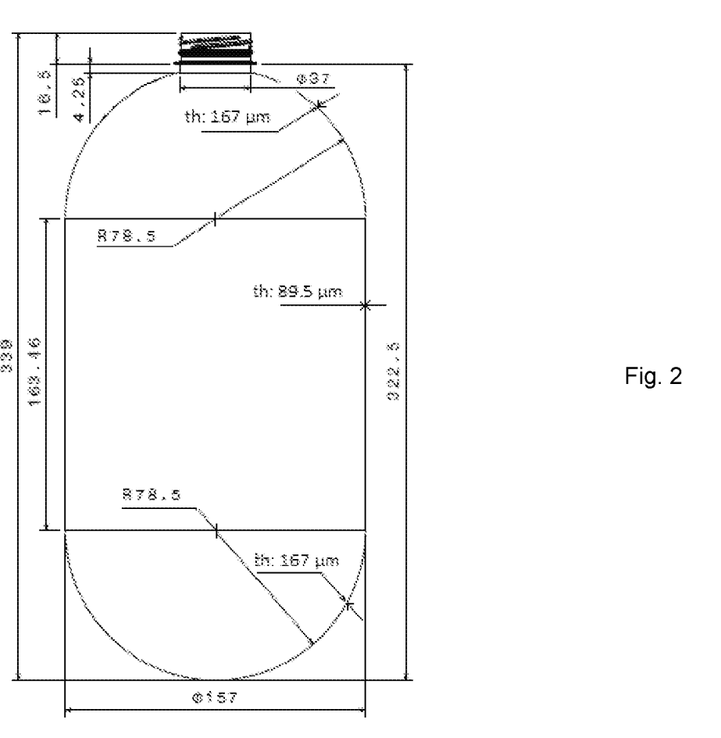
FIG. 2 represents a PET 5 L container of 32 g, formed from the preform of FIG. 1. Dimensions are in mm.

The container is prepared by Injection Stretch Blow Molding the preform represented on FIG. 1, where dimensions are in mm, to obtain the container represented on FIG. 2, where dimensions are in mm.

In FIG. 1 the inner and outer walls exhibit angles relative to the vertical axis (y-axis), at different portions of the preform, which are, from the lower portion to the top portion of the preform, as follows: 0.62° for the inner and the outer walls located immediately above the curved bottom portion, 18.39° for the outer wall and 25.4° for the inner wall for portion located below the neck ring, the outer diameter of the neck ring is 43 mm; the inner diameter of the opening is 33.4 mm; the height of the neck, i.e., from the opening to the neck ring is 16.5 mm; the overall height of the preform is 108.5 mm, the thickness of the bottom portion is 2.5 mm; the thickness of the portion located immediately above the curved bottom portion is 2.66 mm; and the height from the curved bottom to the neck ring is 92 mm;

the curved bottom portion has an internal radius of 12.7 mm, and an external radius of 15.36 mm.

In FIG. 2, the diameter of the container neck is 37 mm; the height of neck is 16.5 mm; the height between the neck ring and the shoulder is 4.25 mm; the height of the body between shoulder and the bottom is 163.46 mm; and the overall height of the container is 339 mm.

The main parameters and features are reported on table 1 below. The container is filled with 5.0 L of water, and sealed with a screw cap.

TABLE 1

| Material and weight (Preform weight) | 32 g rPET |
| --- | --- |
| Weight under Neck (g) | 27.49 |
| Preform body external diameter (mm) | 31.32 |
| Preform body internal diameter (mm) | 26 |
| Preform body thickness (mm) | 2.66 |
| Preform length under neck (mm) | 92 |
| Container diameter (mm) | 157.0 |
| Container length under neck (mm) | 322.5 |
| Shoulder curve radius (mm) | 78.5 |
| Bottom curve radius (mm) | 78.5 |
| Container Reference (cm3) | 5191 |
| Container Surface under neck (cm$^2$) | 1576.96 |
| Axial stretch ratio | 3.57 |
| Hoop stretch ratio | 5 |
| Planar stretch ratio | 17.85 |
| Thickness at shoulder (µm) | 167 |
| Thickness at sidewall (µm) | 89.5 |
| Thickness at bottom (µm) | 167 |
| g/m2 under neck | 161.83 g/m$^2$ |
| Packaging efficacy (g/L) | 6.4 |
| Blowing Equipment type | One blow |
| Preform blowing temperature | 85° C. |
| Blowing pressures | 8 bars pre-blow |
|  | 30 bars blow |
| Blowing time (s) | 1.7 |
| Mold Temperature | 25° C. |

Example 2

A rPET container of 5.0 L of water (reference volume) is implemented.

Figure 3:
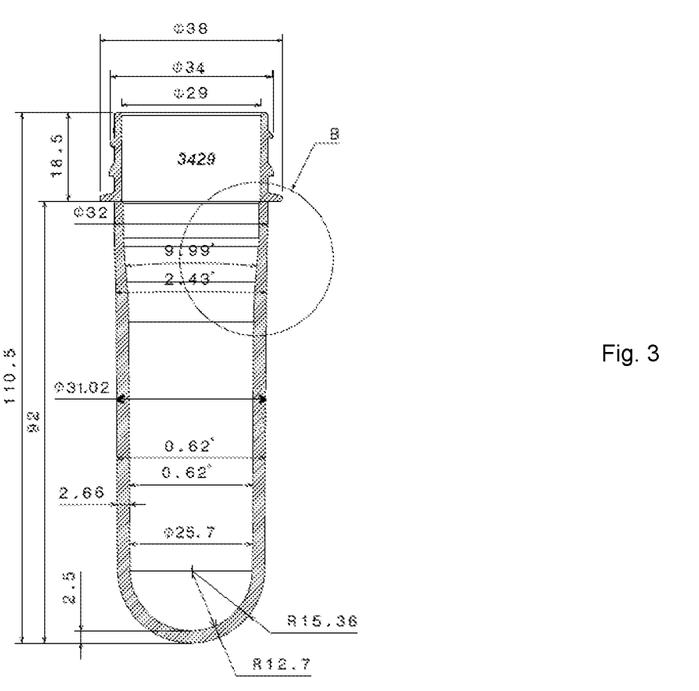
FIG. 3 represents a PET preform of 32 g, for forming a 5 L container. Dimensions are in mm.
Figure 4:
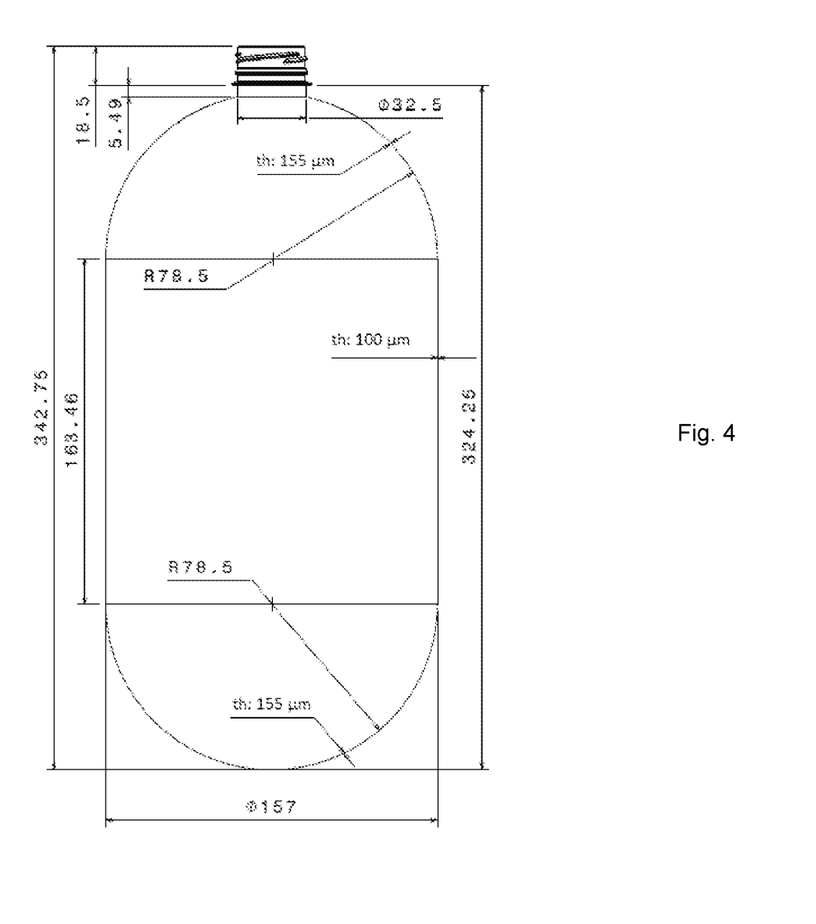
FIG. 4 represents a PET 5 L container of 32 g, formed from the preform of FIG. 3. Dimensions are in mm.

The container is prepared by Injection Stretch Blow Molding the preform represented on FIG. 3, where dimensions are in mm, to obtain the container represented on FIG. 4, where dimensions are in mm.

In FIG. 3 the inner and outer walls exhibit angles relative to the vertical axis, at different portions of the preform, which are, from the lower portion to the top portion of the preform, as follows: 0.62° for the inner and outer walls located immediately above the curved bottom portion, 2.43° for the outer wall and 9.99° for the inner wall for the portion located below the neck ring, the outer diameter of the neck ring is 38 mm; the inner diameter of the opening is 29 mm; the height of the neck is 18.5 mm; the diameter of the neck is 34 mm; the diameter under the neck is 32 mm; and the overall preform height is 110.5 mm, and the bottom portion has an internal radius of 12.7 mm, and an external radius of 15.36 mm.

In FIG. 4, the diameter of the container neck is 32.5 mm; the height of the neck is 18.5 mm; the height between the neck ring and the shoulder is 5.49 mm; the height of the body between the shoulder and the bottom is 163.46 mm; and the overall height of container is 342.75 mm.

The main parameters and features are reported on table 2 below. The container is filled with 5.0 L of water, and sealed with a screw cap.

TABLE 2

| | Preform Material rPET - EcoPet CB 0C 78 supplied by FPR |
|---|---|
| Preform weight (g) | 32 |
| Preform neck type: diameter including threads - internal diameter (mm) | 34-29 |
| Weight under Neck (g) | 27.36 |
| Preform body external diameter (mm) | 31.02 |
| Preform body internal diameter (mm) | 25.7 |
| Preform body thickness (mm) | 2.66 |
| Preform length under neck (mm) | 92 |
| Container diameter (mm) | 157.0 |
| Container length under neck (mm) | 324.25 |
| Shoulder curve radius (mm) | 78.5 |
| Bottom curve radius (mm) | 78.5 |
| Container Reference (cm3) | 5177 |
| Container Surface under neck (cm$^2$) | 1613 |

TABLE 2-continued

| | Preform Material rPET - EcoPet CB 0C 78 supplied by FPR |
|---|---|
| Axial stretch ratio | 3.52 |
| Hoop stretch ratio | 5.06 |
| Planar stretch ratio | 17.81 |
| Thickness at shoulder (μm) | 155 |
| Thickness at sidewall (μm) | 100 |
| Thickness at bottom (μm) | 155 |
| g/m2 under neck | 169.62 |
| Packaging efficacy (g/L) | 6.4 |
| Blowing Equipment type | 1 blow |
| Preform blowing temperature | 85° C. |
| Blowing pressures | 8 bars pre-blow 30 bars blow |
| Blowing time (s) | 1.7 |
| Mold Temperature | 15° C. |

Example 3—Coloration Tests

CIE L*a*b* color tests are performed under to same protocol on 3 empty containers. The protocol involves, for each container, over several samples, measuring the thickness at at least 7 points regularly spaced along the container body and measuring the L* component at the same points. Component L* is representative of lightness: the lower L* is, the darker the coloration is. The average thickness and the average L* component are reported as averages on the measurements at the at least 7 points.

Container 1 is a control virgin PET bottle shape container.

Container 2 is a comparative rPET container having a shape identical to container 1.

Container 3 corresponds to the container described on Example 2.

Details and results are provided on table 3.

TABLE 3

| | Example 3.1 | Example 3.2 | Container 3.3 |
|---|---|---|---|
| Container description | Container 1 Bottle Shape Neck 34-29 | Container 2 Bottle Shape Neck 34-39 | Container of Example 2 Shape represented on FIG. 4 Neck 34-29 |
| Liquid reference volume (L) | 1.5 | 1.5 | 5.0 |
| Material | Virgin PET | rPET - EcoPet CB 0C 78 supplied by FPR | rPET - EcoPet CB 0C 78 supplied by FPR |
| Weight (g) | 34 | 32 | 32 |
| Planar Stretch ratio | about 8 | about 8 | 17.81 |
| Average thickness of the body | $e_1$ = 193 μm | $e_2$ = 157 μm | $e_3$ = 124 μm |
| Average L* | $L^*_1$ = 97.10 | $L^*_2$ = 94.67 | $L^*_3$ = 96.35 |
| Loss of lightness | | $L^*_1 - L^*_2$ = 2.43 | $L^*_1 - L^*_3$ = 0.76 |
| Loss of lightness to thickness | | $(L^*_1 - L^*_2)/e_2$ = 0.0154 | $(L^*_1 - L^*_3)/e_3$ = 0.0061 |

Table 3 shows inter alia that the loss of lightness, per μm of material, due to the use of rPET instead of virgin PET is much lower with the container of the invention (container 3 of example 2).

The invention claimed is:

1. A thin wall container for being filled with a liquid reference volume, comprising a neck and a body comprised of a wall comprising a bottom, a side portion, and a shoulder portion, wherein:

the thin wall container is a monolayer container consisting of polyethylene terephthalate (PET), comprising at least 80% by weight of a PET material recycled by a mechanical route forming recycled polyethylene terephthalate (rPET), the side portion is free of ridges, edges, grooves, and ribs, and the thin wall container exhibits the following features:

Feature a) the wall has a thin portion representing at least 50% as surface of the body having an average thickness of from 50 μm to 125 μm, wherein the thin portion is at least the side portion, Feature b) the thin wall container is a blow molded container and has a planar stretch ratio of from 12.0 to 18, Feature c) a ratio between the container weight and the liquid reference volume of from 5.27 g/L to 9.33 g/L, Feature d) a surface density, determined as a ratio between the container weight and a surface area of the body under the neck, of 100 g/m² to 200 g/m², Feature e) a top load resistance of at least 10 daN for at least 5 mm deformation and/or a lateral load resistance of at least 5 daN for at least 2.5 mm deformation, when filled with liquid at the reference volume and sealed, and Feature f) a reference volume of at most 5.5 L.

2. A thin wall container for being filled with a liquid reference volume, comprising a neck and a body comprised of a wall comprising a bottom, a side portion, and a shoulder portion, wherein:

the thin wall container is a monolayer container consisting of polyethylene terephthalate (PET), comprising at least 80% by weight of a PET material recycled by a mechanical route forming recycled polyethylene terephthalate (rPET), the side portion is free of ridges, edges, grooves, and ribs, and the thin wall container exhibits the following features:

Feature a) the wall has a thin portion representing at least 50% as surface of the body having an average thickness of from 50 μm to 75 μm, wherein the thin portion is at least the side portion, Feature b) the thin wall container is a blow molded container and has a planar stretch ratio of from 12.0 to 19.8, Feature c) a ratio between the container weight and the liquid reference volume of from 5.27 g/L to 9.33 g/L, Feature d) a surface density, determined as a ratio between the container weight and a surface area of the body under the neck, of 100 g/m² to 200 g/m², Feature e) a top load resistance of at least 10 daN for at least 5 mm deformation and/or a lateral load resistance of at least 5 daN for at least 2.5 mm deformation, when filled with liquid at the reference volume and sealed, and Feature f) a reference volume of at most 5.5 L.

* * * * *